US011480904B2

(12) United States Patent
Shah et al.

(10) Patent No.: US 11,480,904 B2
(45) Date of Patent: Oct. 25, 2022

(54) ICONOGRAPHIC CONTROL PANEL OF AN IMAGE FORMING APPARATUS

(71) Applicant: Hewlett-Packard Development Company, L.P., Spring, TX (US)

(72) Inventors: Pratik Shah, San Diego, CA (US); Andrew Chick, Vancouver, WA (US); Kenneth K. Smith, Boise, ID (US); Eun-Kyung Yun, Pangyo (KR); Hye Heon Jung, Pangyo (KR); Dustin C. Rosing, San Diego, CA (US); KyongHwan Kim, Pangyo (KR); ChangYeop Oh, Suwon (KR); KwangSung Park, Pangyo (KR); Nanette Jensen, Boise, ID (US); Virginia K. Capps, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/972,061

(22) PCT Filed: Nov. 6, 2018

(86) PCT No.: PCT/US2018/059409
§ 371 (c)(1),
(2) Date: Dec. 4, 2020

(87) PCT Pub. No.: WO2020/096576
PCT Pub. Date: May 14, 2020

(65) Prior Publication Data
US 2021/0364966 A1 Nov. 25, 2021

(51) Int. Cl.
*G03G 15/00* (2006.01)
*H04N 1/00* (2006.01)

(52) U.S. Cl.
CPC ....... *G03G 15/5016* (2013.01); *H04N 1/0049* (2013.01); *H04N 1/00384* (2013.01); *H04N 1/00408* (2013.01); *H04N 1/00474* (2013.01)

(58) Field of Classification Search
CPC ........... H04N 1/00384; H04N 1/00408; H04N 1/00474; H04N 1/0049; G03G 15/5016
See application file for complete search history.

(56) References Cited

U.S. PATENT DOCUMENTS

| 5,121,113 A | 6/1992 | Kedge et al. |
| 5,513,922 A | 5/1996 | Umbach |

(Continued)

FOREIGN PATENT DOCUMENTS

| CN | 1983244 A | 6/2007 |
| CN | 101071292 A | 11/2007 |

(Continued)

OTHER PUBLICATIONS

Kashiv, Pallvika, CES 2016: Smart Remote is world's first contextual remote control, Jan. 5, 2016, 5 pgs, http://www.homecrux.com/ces-2016-smart-remote-is-worlds-first-contextual-remote-control/40453/.

*Primary Examiner* — Hoang X Ngo
(74) *Attorney, Agent, or Firm* — Jefferson IP Law, LLP

(57) ABSTRACT

An iconographic control panel of an image forming apparatus is provided. The iconographic control panel includes a plurality of physical iconographic control buttons respectively corresponding to a plurality of functions of the image forming apparatus, each of the plurality of physical iconographic control buttons comprising at least one dedicated light emitting diode, and at least one processor to determine an availability of the plurality of functions of the image forming apparatus respectively corresponding to each of the plurality of physical iconographic control buttons, determine a functional state of the plurality of functions of the image (Continued)

forming apparatus determined to be available, and control an illumination of the at least one LED of each of the plurality of physical iconographic control buttons based on the availability of each function corresponding to each of the plurality of physical iconographic control buttons and the functional state of each function determined to be available.

17 Claims, 11 Drawing Sheets

(56) References Cited

U.S. PATENT DOCUMENTS

| | | | |
|---|---|---|---|
| 6,745,334 B1 * | 6/2004 | Ikegami | H04N 1/4433 726/19 |
| 8,289,284 B2 | 10/2012 | Glynn et al. | |
| 9,036,167 B2 * | 5/2015 | Ogino | G03G 15/5016 399/81 |
| 2002/0190956 A1 | 12/2002 | Klein et al. | |
| 2005/0190397 A1 | 9/2005 | Ferlitsch | |
| 2012/0079376 A1 * | 3/2012 | Grellmann | G06F 3/04817 715/830 |
| 2015/0347070 A1 | 12/2015 | Ha et al. | |
| 2015/0363068 A1 | 12/2015 | Borah | |

FOREIGN PATENT DOCUMENTS

| | | | | |
|---|---|---|---|---|
| CN | 101141579 A | | 3/2008 | |
| CN | 101588434 A | | 11/2009 | |
| CN | 103957345 A | | 7/2014 | |
| CN | 105282359 A | | 1/2016 | |
| CN | 106550167 A | | 3/2017 | |
| CN | 111669840 A | * | 9/2020 | ............ H04W 76/11 |
| JP | 2002094908 A | | 3/2002 | |
| JP | 2005138347 A | | 6/2005 | |
| JP | 2006116834 A | | 5/2006 | |
| JP | 2007067705 A | | 3/2007 | |

* cited by examiner

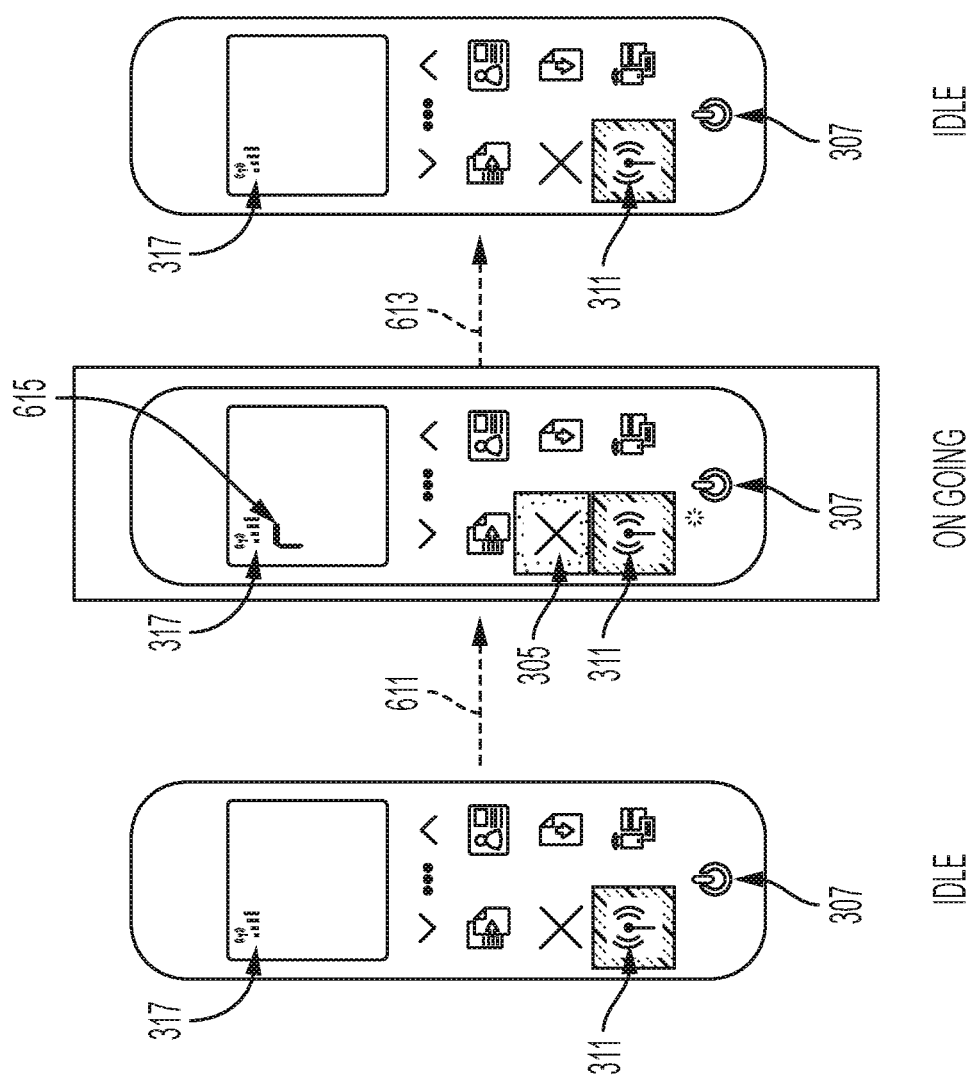

ICONOGRAPHIC CONTROL PANEL OF AN IMAGE FORMING APPARATUS

BACKGROUND

An image forming apparatus is an apparatus that performs generating, printing, receiving, transmitting, and the like of image data. Representative examples of an image forming apparatus may include a printer, a copier, a fax machine, a multi-function printer (MFP) that integrates and realizes their functions, and the like.

BRIEF DESCRIPTION OF THE DRAWINGS

The above and other aspects, features, and advantages of certain examples of the disclosure will be more apparent from the following description taken in conjunction with the accompanying drawings, in which.

Throughout the drawings, it should be noted that like reference numbers are used to depict the same or similar elements, features, parts, components, and structures.

DETAILED DESCRIPTION

Figure 1:
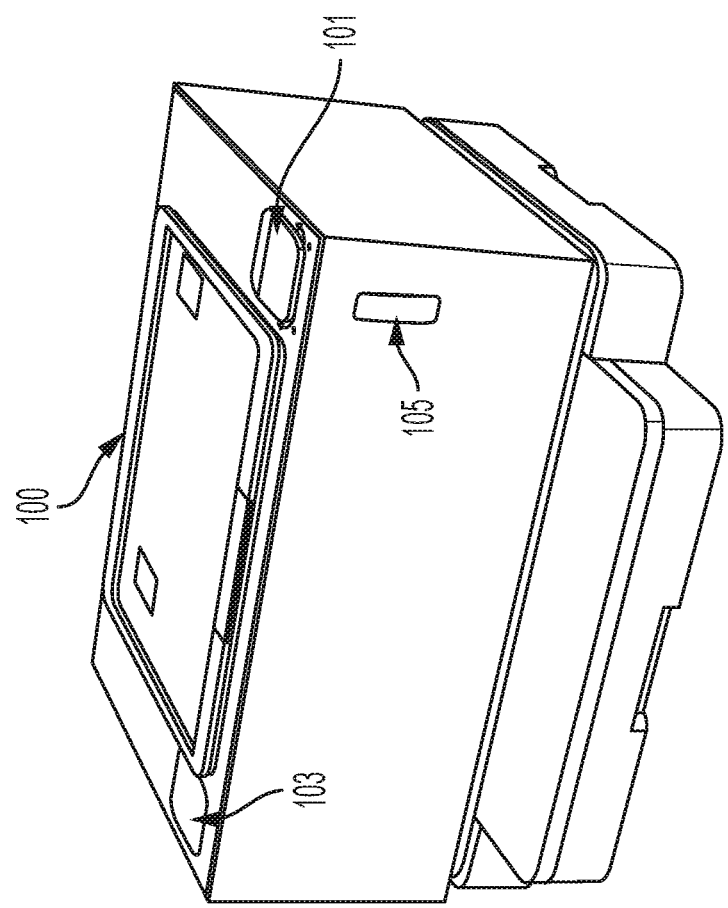
FIG. 1 includes a front side elevational view of example image forming apparatuses.

Reference will now be made to examples, which are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

As used herein, the term "and/or" includes any and all combinations of one or more of the associated listed items. Expressions such as "at least one of," when preceding a list of elements, modify the entire list of elements and do not modify the individual elements of the list.

It will be understood that, when an element is referred to as being "connected to" another element, the element can be directly connected to the other element or intervening elements may be present therebetween. When a portion "includes" an element, another element may be further included, rather than excluding the existence of the other element, unless otherwise described.

The term "image forming job" used herein may refer to image formation or various jobs (e.g., printing, copying, scanning, or faxing) related to an image, for example, creation, storage, transmission, etc. of an image file. The term "job" may refer to not only an image forming job but also a series of processes required to perform the image forming job.

In addition, the term "image forming apparatus" may refer to all apparatuses, such as a printer, a copier, a scanner, a fax machine, a multi-function printer (MFP), or a display, which are capable of performing an image forming job.

In addition, the term "print data" may refer to data converted into a format able to be printed by a printer.

In addition, the term "scan file" may refer to a file created by scanning an image in a scanner.

In addition, the term "user" may refer to a person who performs manipulations related to an image forming job by using an image forming apparatus or a device connected to the image forming apparatus in a wired or wireless manner.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

Some control panels for image forming apparatuses perform poorly from a usability perspective as there are buttons provided to the user that can be pressed anytime. The buttons are often simple buttons repurposed for complex tasks and frequently have indicators that are repurposed for different message types. Additionally, the indicators may be insufficient to clearly communicate the nature of the repurposing, thereby leaving the user confused. Accordingly, simple buttons and indicators that are repurposed for multiple functions may be a disadvantage for the user input/output (I/O) interface in an image forming apparatus.

Examples of the present invention include a class 1 control panel with single purpose buttons and indicators which are lit up contextually to guide the user through active functionality during different steps of a print job. For example, a cancel button may be active and illuminated only when there is a print job to cancel. In contrast, when the image forming apparatus is in an idle state, the cancel button may not be active or illuminated. In some instances, a button corresponding to a copy functionality may be illuminated and active only when a user lifts a scan lid to place a document on a scanner thereby providing contextual guidance to the user to allow the user to easily choose a desired function. Examples may also include a segmented liquid crystal display (LCD) for providing intuitive controls for settings such as a number of copies, contrast, scale, and the like.

FIG. 1 includes a front side elevational view of an example image forming apparatus.

Referring to FIG. 1, an image forming apparatus 100 is an apparatus that performs generating, printing, copying, receiving, transmitting, and the like of image data. Representative examples of an image forming apparatus may include a printer, a copier, a scanner, a fax machine, a multi-function printer (MFP) that integrates and realizes their functions, and the like.

The image forming apparatus 100, in accordance with examples of the present invention, may include an iconographic control panel 103 for receiving a user input, an illuminated toner fuel gauge 105, and a toner replenishment port 101 mounted to an external surface of the image forming apparatus 100 to receive toner replenishment from an external toner replenishment device.

While one toner replenishment port 101 on top of the image forming apparatus 100 is illustrated in FIG. 1, more than one toner replenishment port may be present on the image forming apparatus 100 in some examples and/or a toner replenishment port may be located elsewhere on the image forming apparatus 100. For instance, a toner replenishment port may be present on a side of the image forming apparatus 100 or on a plurality of sides of the image forming apparatus 100, and/or a plurality of toner replenishment ports may be present on top of the image forming apparatus 100, among other options.

In some examples, the iconographic control panel 103 may include a segmented LCD as well as a plurality of physical iconographic control buttons respectively corresponding to a plurality of functions of the image forming apparatus 100. In some instances, each of the plurality of physical iconographic control buttons may include at least one dedicated incandescent bulb, light emitting diode (LED), organic LED (OLED), or any other suitable lighting technology As with the iconographic control panel 103, in certain examples, the toner fuel gauge 105 may be illuminated by at least one incandescent bulb, LED, OLED, or any other suitable lighting technology. Further, according to some examples, the toner fuel gauge 105 of the image forming apparatus 100 may be informative and not interactive in nature. For instance, the toner fuel gauge 105 may selectively display a toner fuel level and at least one warning indicator relating to the functional state of the toner of the image forming apparatus 100.

Figure 2:
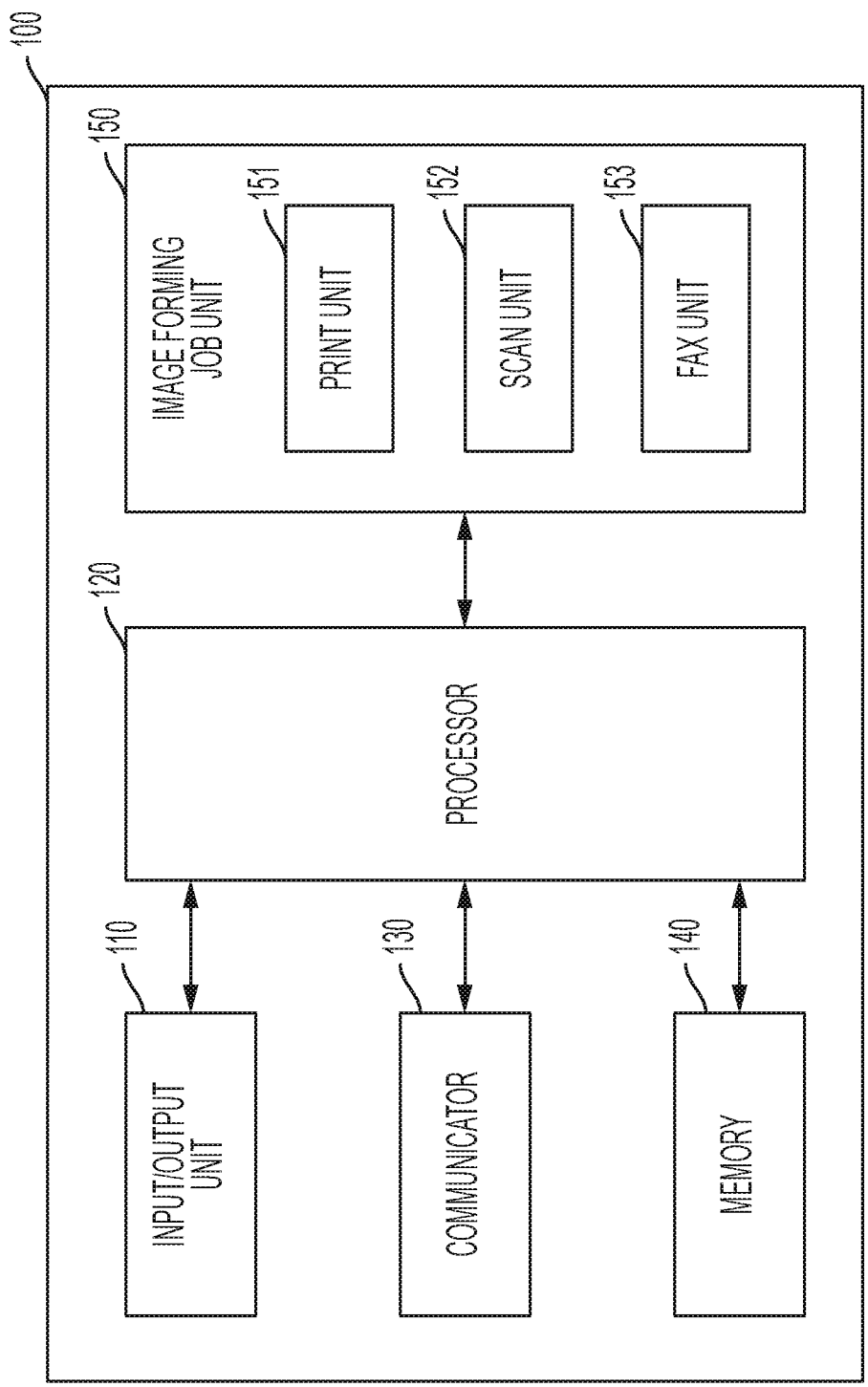
FIG. 2 includes a block diagram of a structure of an image forming apparatus according to an example.

FIG. 2 includes a block diagram of a structure of an image forming apparatus according to an example.

Referring to FIG. 2, an image forming apparatus 100 may include an input/output (I/O) unit 110, a processor 120, a communicator 130, a memory 140, and an image forming job unit 150. Although not shown, the image forming apparatus 100 may further include other components such as a power supply for supplying power to each element of the image forming apparatus 100.

The I/O unit 110 may include an input unit that receives, from a user, an input, etc. for performing an image forming job, and an output unit that displays a result of the image forming job, information regarding a state of the image forming apparatus 100, etc. For example, the I/O unit 110 may include an iconographic control panel 103 for receiving a user input, a display panel for showing a screen, an illuminated toner fuel gauge 105, etc.

As an example, the input unit may include a device, such as, a keyboard, a physical button, a touch screen, a camera, a microphone, etc., which may receive various types of user inputs. Also, the output unit may include, for example, a display panel, a speaker, etc. However, the present disclosure is not limited thereto, and the I/O unit 110 may include a device that supports various inputs and outputs.

The processor 120 may control operations of the image forming apparatus 100 and may include a processor such as a central processing unit (CPU). The processor 120 may control other elements included in the image forming apparatus 100 so as to perform operations corresponding to a user input received through the I/O unit 110.

For example, the processor 120 may execute a program stored in the memory 140, read a file stored in the memory 140, store a new file in the memory 140, etc.

The communicator 130 may perform wired/wireless communication with another device or a network. To this end, the communicator 130 may include a communication module, such as a transceiver, that supports at least one of various wired/wireless communication methods. For example, the communication module may be a chipset, a sticker/a barcode (e.g., a sticker including a near field communication (NFC) tag), etc. including information required for communication.

The wireless communication may include, for example, at least one of Wireless Fidelity (Wi-Fi), Wi-Fi Direct, Bluetooth, Ultra Wide Band (UWB) and NFC. The wired communication may include, for example, at least one of a universal serial bus (USB) and a wired local area network (LAN) (Ethernet).

The communicator 130 may be connected to an external device outside the image forming apparatus 100 and may receive/transmit signals or data from/to the external device. The communicator 130 may transmit signals or data received from the external device to the processor 120 or may transmit signals or data generated in the processor 120 to the external device. For example, when the communicator 130 receives a print command signal and print data from the external device, the processor 120 may output the received print data through a print unit 151.

Programs such as applications and data such as files may be installed and stored in the memory 140. The processor 120 may access and use the data stored in the memory 140 or may store new data in the memory 140. Also, the processor 120 may execute the programs installed in the memory 140 and may install, in the memory 140, applications externally received through the communicator 130. In some examples the memory 140 may be non-volatile memory. For instance, non-volatile memory may include read-only memory, electrically erasable programmable read-only memory (EEPROM), flash memory, ferroelectric RAM, hard disk drives, and solid state drives, and other kinds of suitable memory.

The image forming job unit 150 may perform an image forming job such as printing, scanning, copying, or faxing.

Still referring to FIG. 2, the image forming job unit 150 includes the print unit 151, a scan unit 152, and a fax unit 153. However, according to necessity, the image forming job unit 150 may include only some of the print unit 151, the scan unit 152, and the fax unit 153 or may further include an element that performs another image forming job.

The print unit 151 may form an image on a recording medium by using various printing methods such as an electrophotography method, an inkjet method, a thermal transfer method, a thermosensitive method, and the like. In an example, the print unit 151 may print an image on the recording medium through a series of processes including an exposing process, a developing process, a transfer process, and a fusing process.

The scan unit 152 may irradiate light onto a document and may read an image recorded on the document by receiving light reflected from the document. A charge coupled device (CCD), a contact type image sensor (CIS), or the like may be used as an image sensor that reads the image from the document. The scan unit 152 may have a flatbed structure, in which a document is fixed at a certain location and an image is read from the document by a moving image sensor, a document-feed structure, in which an image sensor is fixed at a certain location and a document is moved relative thereto, or a combination thereof.

The fax unit 153 may share an element for scanning an image with the scan unit 152 and may share an element for printing a received file with the print unit 151. The fax unit 153 may transmit a scanned file to a destination or may externally receive a file.

Figure 3:
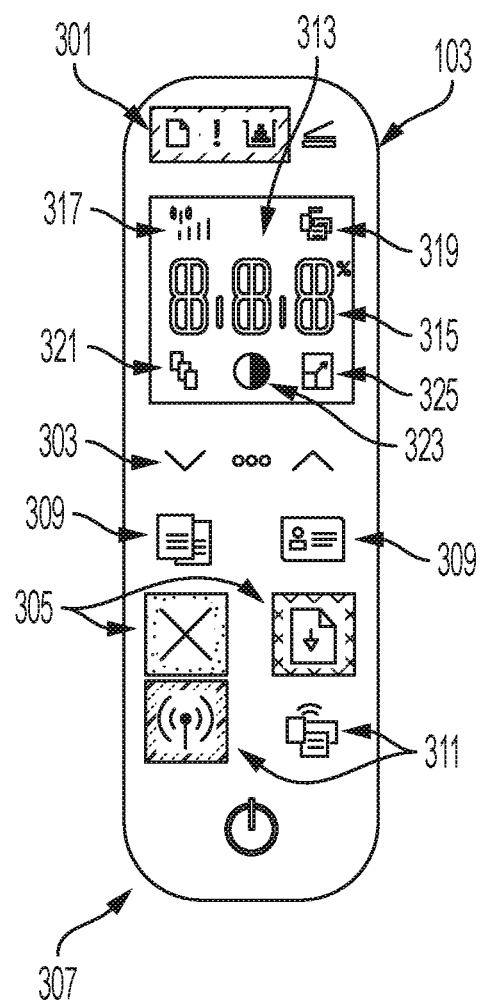
FIG. 3 includes a top elevational view of an example of an iconographic control panel.

FIG. 3 includes a top elevational view of an example of an iconographic control panel.

Referring to FIG. 3, the iconographic control panel 103 may include at least one troubleshooting LED 301, at least one physical menu control button 303, at least one job control button 305, a power button 307, at least one copy button 309, at least one wireless network button 311, and a segmented LCD display panel 313.

In some examples, the at least one troubleshooting LED 301 may include three LEDs corresponding to, for example, an indicator representing paper, an indicator for attention, an indicator representing a toner cartridge, and the like. In some instances, the three LEDs may be amber LEDs that may illuminate the indicator when there is a problem with the paper supply, general attention that is needed, a problem with a toner cartridge of the image forming apparatus 100, and the like. For example, the at least one trouble shooting LED 301 may indicate a functional error with at least one of a paper supply of the image forming apparatus, a toner cartridge of the image forming apparatus, and a lid of the image forming apparatus.

The at least one trouble shooting LED 301 may further include an LED corresponding to an open lid. In some instances, the LED corresponding to the open lid may be a white LED and be employed when a two-sided copy is being made, such as when a copy of an identification (ID) card is being made, to prompt the user to open the lid and turn a document over, such as turn over the identification card. The image forming apparatus 100 may also include a Hall Effect sensor for detecting when a user opens the lid. The Hall Effect sensor may be used to provide contextual lighting of copy buttons, menus, buttons, and LCD screen changes in response to placing a document on a scanner bed of the image forming apparatus 100.

In some examples, the at least one physical menu control button 303 may include three physical, iconographic menu control buttons. The three physical, iconographic menu control buttons may include an up button, a down button, and a menu button. The up button and down button may be used to respectively increase or decrease a value that appears on the LCD display panel 313. In some instances, the menu button may be used to navigate through an option to adjust a number of copies, a contrast of a print job, a scale of a print job, and the like. In some examples, the three physical, iconographic menu control buttons may be illuminated with a white light (e.g., a white LED) that results in the buttons being grey when not illuminated and white when illuminated. Instances in which the at least one physical menu control button 303 is not illuminated indicate that the corresponding functions are not available.

In some examples, the at least one job control button 305 may include a physical, iconographic cancel button and a physical, iconographic resume button. The cancel button may be used to stop or cancel a job in progress. The cancel button may be illuminated with a red light (e.g., a red LED) that results in the button being grey when not illuminated and red when illuminated. The resume button may be used after a paper is added or a warning is cleared to restart the print job. The resume button may be illuminated with a green light (e.g., a green LED) that results in the button being grey when not illuminated and green when illuminated. Instances in which the job control buttons are not illuminated indicate that the corresponding functions are not available.

In some examples, the power button 307 may include a physical, iconographic power button. The power button 307 may indicate an off status, a starting up status, a shutting down status, and the like of the image forming apparatus 100. The power button 307 may also indicate a print job in progress. The power button 307 may be illuminated with a white light (e.g., a white LED) that results in the power button 307 being grey when not illuminated and white when illuminated. The power button 307 may not be illuminated when the image forming apparatus 100 is in an off state, may be illuminated with a steady white light when the image forming apparatus 100 is in an on-state, and may be illuminated with a blinking white light when the image forming apparatus 100 is starting up, shutting down, or processing a print job.

In some examples, the at least one copy button 309 may include a physical, iconographic copy button and a physical, iconographic ID copy button. The copy button may be used to initiate a copy job. The copy button may be illuminated with a white light (e.g., a white LED) that results in the copy button being grey when not illuminated and white when illuminated. The ID copy button may be used to copy an ID card. When selected, the iconographic control panel may prompt the user to turn the ID card over by illuminating the open lid icon after the front side of the ID card is captured. The ID copy button may be illuminated with a white light (e.g., a white LED) that results in the copy button being grey when not illuminated and white when illuminated. Instances in which the at least one copy button 309 is not illuminated indicate that the corresponding functions are not available.

In some examples, the at least one wireless network button 311 may include a physical, iconographic wireless button and a physical, iconographic Wi-Fi direct button. The Wi-Fi Direct button may indicate the state of the communicator 130. The wireless button may be alternately illuminated with a blue light and an amber light (e.g., a blue LED and an amber LED) that results in the wireless button being grey when not illuminated, the wireless button being illuminated blue when the communicator 130 has an established connection, and the wireless button being illuminated amber when the communicator 130 has a connection error. The Wi-Fi direct button may be used in enable and disable Wi-Fi Direct. The wireless button may be illuminated with a white light (e.g., a white LED) that results in the Wi-Fi Direct button being grey when not illuminated and white when illuminated. Instances in which the at least one wireless network button 311 is not illuminated indicate that the corresponding functions are not available.

In some examples, the segmented LCD display panel 313 may include three instances of a nine segment numeric/character to display at least one on-off icon. The three instances of the nine segment numeric/character display may be used to display copy settings, including a number of copies, contrast, and scale. In some instances, the segmented LCD display may be a seven segment display, a fifteen segment display, or another functionally acceptable segmented display. In some instances, the segments can be used for event codes to provide the user further information. For example, an event code "Er 0 3" may be used to indicate a paper jam in a feed tray of the image forming apparatus, an event code of "Er 0 5" may be used to indicate an output bin jam, an event code "Er 0 1" may be used to indicate a lack of paper, an event code "Er 0 2" may be used to indicate an open door, an event code of "Er 0 8" may be used to indicate a lack of toner, or an event code "Er 0 7" may be used to indicate a missing or incorrectly installed toner cartridge. In some instances, the segments can be used to indicate an ongoing job or function. For example, a race track animation may be displayed within one of the three instances of the nine segment numeric/character display to indicate an ongoing job or function.

The at least one on-off icon may include seven or more individual on-off icons representing a Wi-Fi signal strength 317, a Wi-Fi Direct status 319, a percentage, a number of copies 321, a contrast 323, and a scale 325.

Figure 4:
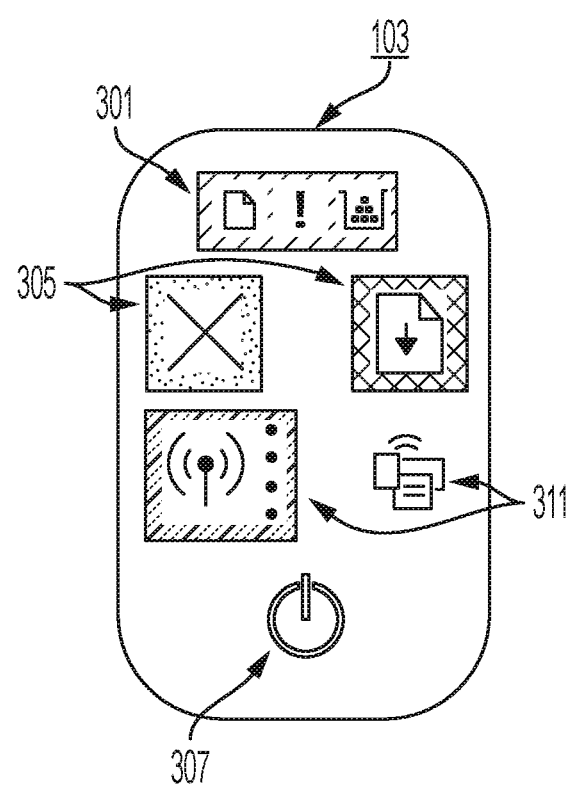
FIG. 4 includes a top elevational view of an example of an iconographic control panel.

FIG. 4 includes a top elevational view of an example of an iconographic control panel.

Referring to FIG. 4, the iconographic control panel 103 may include at least one troubleshooting LED 301, at least one job control button 305, a power button 307, and at least one wireless network button 311.

As described above, in some examples, the at least one troubleshooting LED 301 may include three LEDs corresponding to, for example, an indicator representing paper, an indicator for attention, an indicator representing a toner cartridge, and the like. In some instances, the three LEDs may be amber LEDs that illuminate the indicator when there is, for example, a problem with the paper supply, general attention that is needed, a problem with a toner cartridge of the image forming apparatus 100, and the like.

In some examples, the at least one job control button 305 may include a physical, iconographic cancel button and a physical, iconographic resume button. The cancel button may be used to stop or cancel a job in progress. The cancel button may be illuminated with a red light (e.g., a red LED) that results in the button being grey when not illuminated and red when illuminated. The resume button may be used after a paper is added or a warning is cleared to restart the print job. The resume button may be illuminated with a green light (e.g., a green LED) that results in the button being grey when not illuminated and green when illuminated. Instances in which the job control buttons are not illuminated indicate that the corresponding functions are not available.

In some examples, the power button 307 may include a physical, iconographic power button. The power button 307 may indicate an off status, a starting up status, a shutting down status, and the like of the image forming apparatus 100. The power button 307 may also indicate a print job in progress. The power button 307 may be illuminated with a white light (e.g., a white LED) that results in the power button 307 being grey when not illuminated and white when illuminated. The power button 307 may not be illuminated when the image forming apparatus 100 is in an off state, may be illuminated with a steady white light when the image forming apparatus 100 is in an on-state, and may be illuminated with a blinking white light when the image forming apparatus 100 is starting up, shutting down, or processing a print job.

In some examples, the at least one wireless network button 311 may include a physical, iconographic wireless button and a physical, iconographic Wi-Fi direct button. The wireless button may indicate the state of the communicator 130. The wireless button may be alternately illuminated with a blue light and an amber light (e.g., a blue LED and an amber LED) that results in the wireless button being grey when not illuminated, the wireless button being illuminated blue when the communicator 130 has an established connection, and the wireless button being illuminated amber when the communicator 130 has a connection error. Additionally, the physical, iconographic wireless button may include four aligned blue LEDs corresponding to a strength of the corresponding wireless signal. The Wi-Fi direct button may be used in enable and disable Wi-Fi Direct. The wireless button may be illuminated with a white light (e.g., a white LED) that results in the Wi-Fi Direct button being grey when not illuminated and white when illuminated. Instances in which the at least one wireless network button 311 is not illuminated indicate that the corresponding functions are not available.

Figure 5:
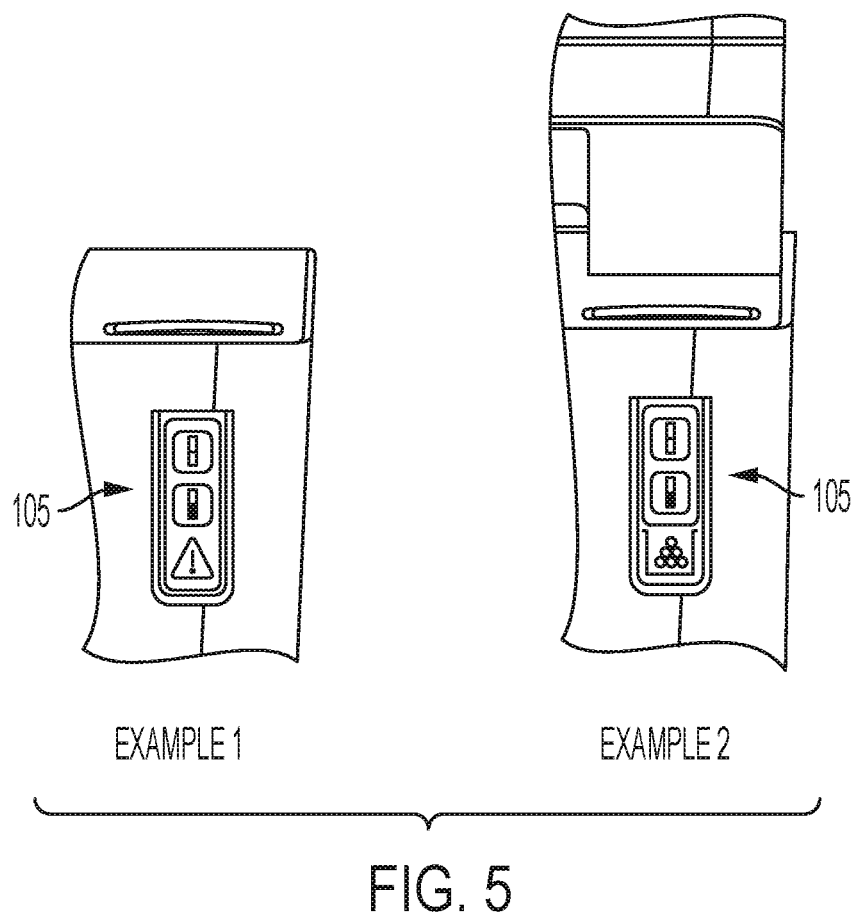
FIG. 5 includes a perspective view of an example of a toner fuel gauge.

FIG. 5 includes a perspective view of examples of a toner fuel gauge.

Referring to FIG. 5, the toner fuel gauge 105 may include a gauge with three illuminated icons. The three icons may include three icons for prompting a user to refill the toner using an external toner replenishment device when the image forming apparatus 100 is running low on toner. In some instances, the three illuminated icons may include three bi-colored LEDs. For example, the three LEDs may be amber and white LEDs.

FIGS. 6A-D include flow diagrams illustrating examples of context based illumination of an iconographic control panel.

Figure 6A:
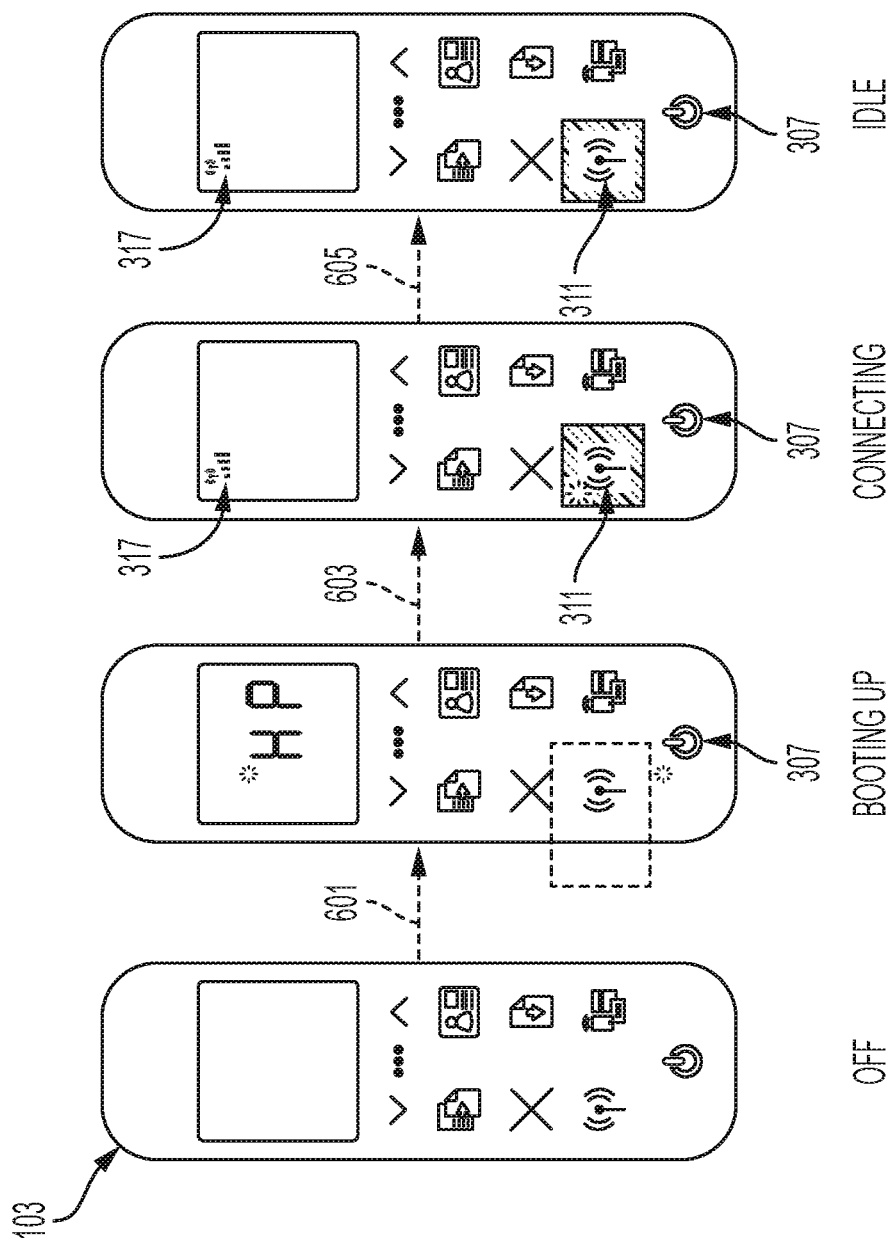
FIGS. 6A-D include flow diagrams illustrating examples of context based illumination of an iconographic control panel.

Referring to FIG. 6A, a contextually based illumination of the iconographic control panel 103 during a boot-up of the image forming apparatus 100 after an initial configuration is performed and Wi-Fi has been setup is illustrated, in accordance with examples. With the image forming apparatus 100 initially turned off, the power button 307 is pressed, at 601, and the power button 307 may turn on and begin to blink. In some instances, the power button 307 may blink at a rate of approximately once every 600 ms.

Concurrently, the LCD display panel 313 may display a blinking event code using the nine segment numeric/character display 315 while the other physical, iconographic buttons and the on-off icons are off and not illuminated.

After a period of time, at 603, the LCD display panel 313 may begin to indicate an establishment of a wireless connection of the image forming apparatus 100. In the context of the image forming apparatus 100 beginning to establish a wireless connection, the power button 307 may be illuminated, without interruption or blinking, and the at least one wireless network button 311 may begin to blink. For example, the wireless button may begin to blink blue while the power button 607 is steadily illuminated white.

Concurrently, the LCD display panel 313 may display the Wi-Fi signal strength 317 with a signal bar that is cycling while the other physical, iconographic buttons and the on-off icons are off and not illuminated.

After a period of time, at 605, the LCD display panel may indicate an established wireless connection of the image forming apparatus 100 while in an idle mode. In the context of the image forming apparatus 100 establishing a wireless connection and entering an idle mode, the power button 307 may be illuminated, without interruption or blinking, and the at least one wireless network button 311 may be illuminated, without interruption or blinking. For example, the wireless button of the at least one wireless network button 311 may be steadily illuminated blue while the power button 607 is steadily illuminated white.

Concurrently, the LCD display panel 313 may display the Wi-Fi signal strength 317 with a steadily illuminated signal bar while the other physical, iconographic buttons and the on-off icons are off and not illuminated.

Referring to FIG. 6B, a contextually based illumination of the iconographic control panel 103 during a print job from an external device is illustrated, in accordance with examples.

With the image forming apparatus 100 initially in an idle state, in which the power button 307 is steadily illuminated and the at least one wireless network button 311 is steadily illuminated (i.e., without interruption or blinking), the image forming apparatus 100 may receive a print job from an external device, at 611. In the context of the image forming apparatus 100 in an idle state receiving a print job from an external device, the power button 307 may begin to blink, the at least one wireless network button 311 may be steadily illuminated, and the cancel button 305 may be steadily illuminated.

Concurrently, the LCD display panel 313 may display a racetrack animation 615 using the nine segment numeric/character display 315 and the Wi-Fi signal strength 317 with a steadily illuminated signal bar while the other physical, iconographic buttons and the on-off icons are off and not illuminated.

Once a job is ongoing, all buttons are disabled except the cancel button 305 and the power button 307. With an ongoing job, pressing the cancel button 305 may cancel the job and pressing the power button 307 may cancel the job and power down the device. If a user pressed a disabled button, the LED associated with the button may fast blink for a period of time and then return to its original unilluminated state. In some instances the fast blinking may continue for 3 seconds. If a user presses a disabled button that is not illuminated by an associated LED, the power button 307 may fast blink for a period of time and then return to its previous state.

After the print job is completed, at 613, the image forming apparatus 100 may return to an idle state in which the power button 307 is steadily illuminated and the at least one wireless network button 311 is steadily illuminated. Concurrently, the LCD display panel 313 may display the Wi-Fi signal strength 317 with a steadily illuminated signal bar while the other physical, iconographic buttons and the on-off icons are off and not illuminated.

Figure 6C:
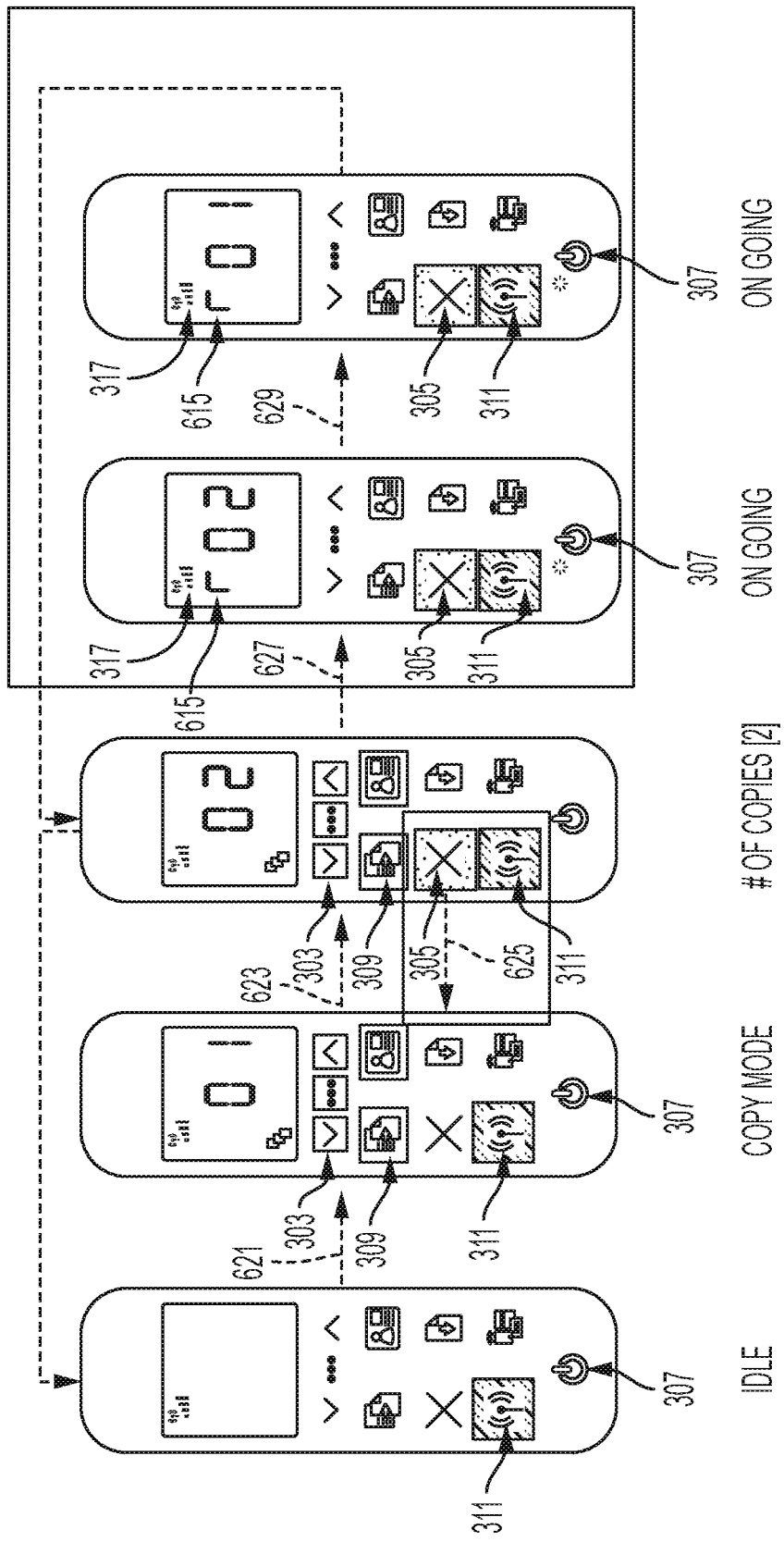
Figure 6D:
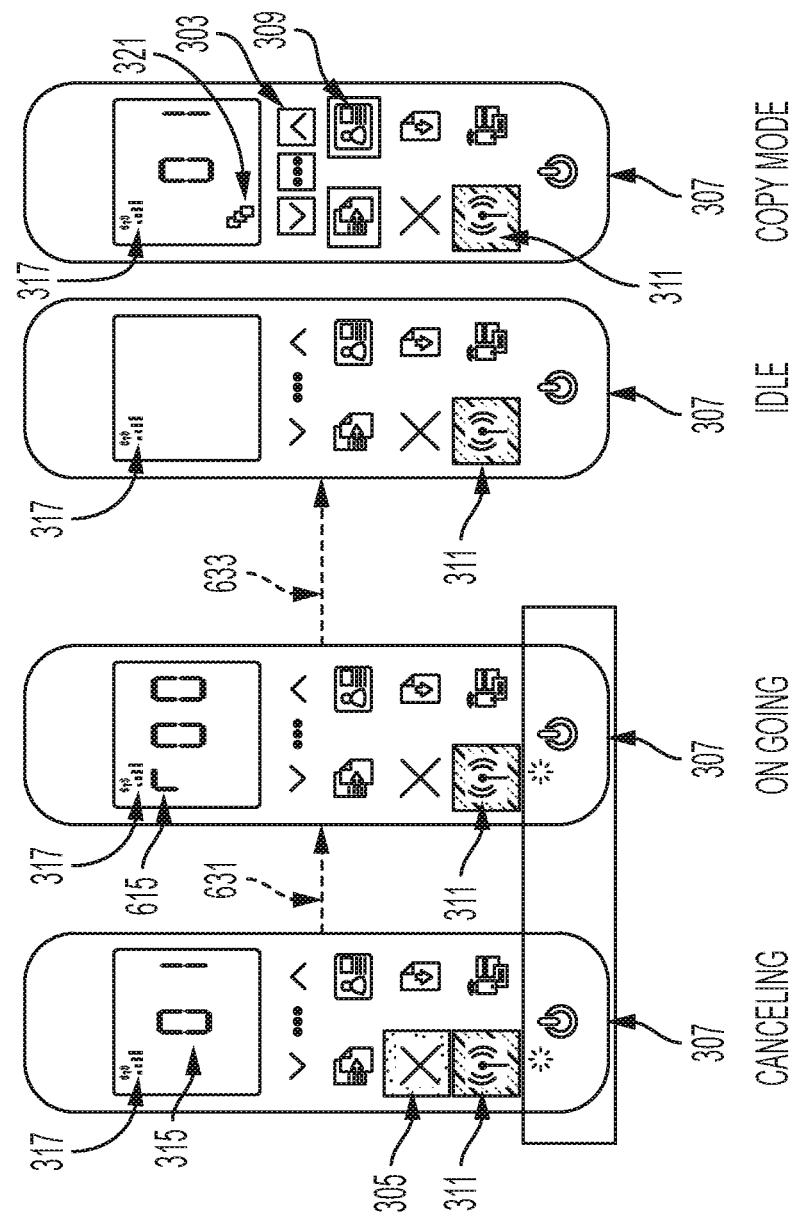
Figure 6E:
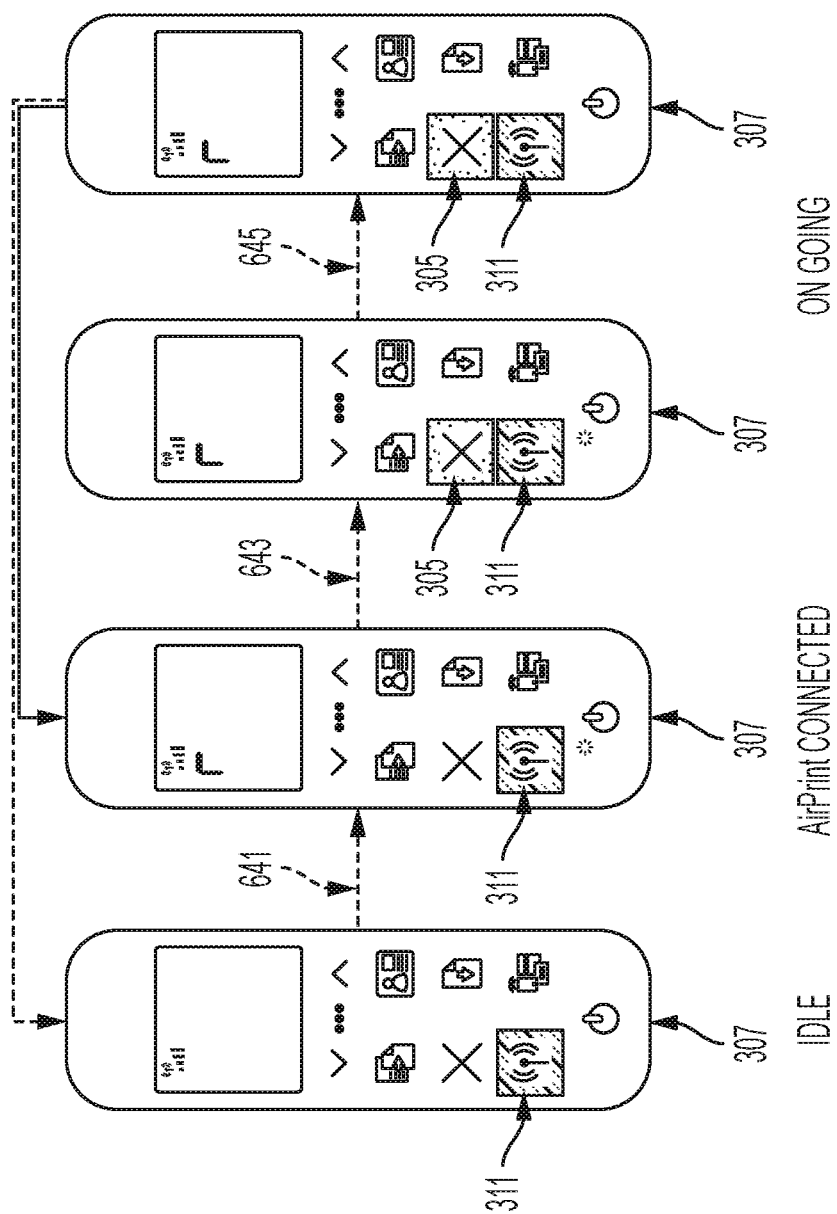

Referring to FIG. 6C, a contextually based illumination of the iconographic control panel 103 during a copy job is illustrated, in accordance with examples.

With the image forming apparatus 100 initially in an idle state, in which the power button 307 is steadily illuminated and the at least one wireless network button 311 is steadily illuminated, the image forming apparatus 100 may have a document placed on a scanner bed of the image forming apparatus 100, at 621. In the context of the image forming apparatus 100 in an idle state having a document placed on a scanner bed of the image forming apparatus 100, the power button 307 may remain steadily illuminated, the at least one wireless network button 311 may be steadily illuminated, the at least one copy button 309 may be steadily illuminated, and the at least one physical menu control button 303 may be steadily illuminated.

Concurrently, the LCD display panel 313 may display a number of copies icon 321, along with a two digit default number of copies using the nine segment numeric/character display 315, and the Wi-Fi signal strength 317 with a steadily illuminated signal bar while the other physical, iconographic buttons and the on-off icons are off and not illuminated. In some examples, the default number of copies displayed on segmented numeric/character display 315 may be one.

With the image forming apparatus 100 in a copy state, in which the power button 307 is steadily illuminated, the at least one wireless network button 311 is steadily illuminated, the at least one copy button 309 is steadily illuminated, and the at least one physical menu control button 303 is steadily illuminated, the image forming apparatus 100 may have an up button of the at least one physical menu control button 303 pressed, at 623. In the context of the image forming apparatus 100 in a copy state having an up button of the at least one physical menu control button 303 pressed, the power button 307 may remain steadily illuminated, the at least one wireless network button 311 may remain steadily illuminated, the at least one copy button 309 may remain steadily illuminated, and the at least one job control button 305 (e.g., the cancel button) may be steadily illuminated.

Concurrently, the LCD display panel 313 may display a number of copies icon 321 and the Wi-Fi signal strength 317 with a steadily illuminated signal bar. Additionally, the two digit number of copies being displayed using the nine segment numeric/character display 315 may be increased by one while the other physical, iconographic buttons and the on-off icons are off and not illuminated.

With the image forming apparatus 100 in a copy state with a two digit number of copies different than the default number being displayed, in which the power button 307 is steadily illuminated, the at least one wireless network button 311 is steadily illuminated, the at least one copy button 309 is steadily illuminated, the at least one physical menu control button 303 is steadily illuminated, and the at least one job control button 305 (e.g., the cancel button) is steadily illuminated, the image forming apparatus 100 may have the cancel button of the at least one job control button 305 pressed, at 625. In the context of the image forming apparatus 100 in a copy state having the cancel button of the at least one job control button 305 pressed, the power button 307 may remain steadily illuminated, the at least one wireless network button 311 may remain steadily illuminated, the at least one copy button 309 may remain steadily illuminated, and the at least one physical menu control button 303 is steadily illuminated. In addition, the illumination of the at least one control button 305 (e.g., the cancel button) may be removed (i.e. the cancel button may transition such that it is no longer illuminated).

Concurrently, the LCD display panel 313 may display a number of copies icon 321 and the Wi-Fi signal strength 317 with a steadily illuminated signal bar. Additionally, the two digit number of copies being displayed using the nine segment numeric/character display 315 may be reset to the default number while the other physical, iconographic buttons and the on-off icons are off and not illuminated.

With the image forming apparatus 100 in a copy state with a two digit number of copies different than the default number being displayed, in which the power button 307 is steadily illuminated, the at least one wireless network button 311 is steadily illuminated, the at least one copy button 309 is steadily illuminated, the at least one physical menu control button 303 is steadily illuminated, and the at least one job control button 305 (e.g., the cancel button) is steadily illuminated, the image forming apparatus 100 may have the at least one copy button 309 pressed, at 627. In the context of the image forming apparatus 100 in a copy state having the at least one copy button 309 pressed, the at least one wireless network button 311 may remain steadily illuminated, the at least one job control button 305 (e.g., the cancel button) may remain steadily illuminated, and the illumination of power button 307 may begin to blink or flash. In addition, the illumination of the at least one physical menu control button 303 and the at least one copy button 309 may be removed (i.e., the at least one physical control button 303 and at least one copy button 309 may transition such that they are no longer illuminated).

Concurrently, the LCD display panel 313 may display the Wi-Fi signal strength 317 with a steadily illuminated signal bar. Additionally, the two digit number of copies being displayed using the nine segment numeric/character display 315 may display the number of copies selected by the user and a race track animation while the other physical, iconographic buttons and the on-off icons are off and not illuminated.

Once a job is ongoing the number of copies may be displayed using the nine segment numeric/character display 315, starting at the total number of copies selected by user input, and may count down by 1, at 629, as each copy is printed. After reaching 1, the display may return to copy mode and display the configured options.

Further, once a job is ongoing, all buttons are disabled except the cancel and power buttons. With an ongoing job, pressing the cancel button 305 may cancel the job and pressing the power button 307 may cancel the job and power down the device. If a user pressed a disabled button, the LED associated with the button may fast blink for a period of time and then return to its original unilluminated state. In some instances the fast blinking may continue for 3 seconds. If a user presses a disabled button that is not illuminated by an associated LED, the power button 307 may fast blink for a period of time and then return to its previous state.

In some examples, after a period of non-use all control panel settings may revert to default settings and the image forming apparatus 100 may return to the idle mode. In certain examples, after 2 minutes of non-use all control panel setting may revert to default settings and the image forming apparatus 100 may return to the idle mode Referring to FIG. 6D, a contextually based illumination of the iconographic control panel 103 during a cancelling of a print job or copy job is illustrated, in accordance with examples.

With the image forming apparatus 100 initially in an ongoing print or copy state, in which the illumination of the power button 307 is blinking or flashing, the at least one wireless network button 311 is steadily illuminated, and the at least one job control button 305 (e.g., the cancel button) is steadily illuminated, the image forming apparatus 100 may have the cancel button of the at least one job control button 305 pressed, at 631. In the context of the image forming apparatus 100 in an ongoing print or copy state having the cancel button of the at least one job control button 305 pressed, the illumination of the power button 307 may be blinking or flashing and the at least one wireless network button 311 may be steadily illuminated. In addition, the illumination of the at least one control button 305 (e.g., the cancel button) may be removed (i.e., the cancel button may transition such that it is no longer illuminated).

During an ongoing job, the cancel and power buttons may be the only active button on the device. Once the cancel button is pressed, the process of canceling the job may begin immediately. If there is a paper in the paper path, the paper may be ejected once the job is canceled. If a copy job is being canceled, the number of copies counter may be set to zero immediately.

Concurrently, the LCD display panel 313 may display the Wi-Fi signal strength 317 with a steadily illuminated signal bar. Additionally, the two digit number of copies being displayed using the nine segment numeric/character display 315 may display a two digit zero and a race track animation while the other physical, iconographic buttons and the on-off icons are off and not illuminated.

In response to a print job being canceled in the image forming apparatus 100, at 633, the image forming apparatus 100 may return to an idle state in which the power button 307 is steadily illuminated and the at least one wireless network button 311 is steadily illuminated. Concurrently, the LCD display panel 313 may display the Wi-Fi signal strength 317 with a steadily illuminated signal bar while the other physical, iconographic buttons and the on-off icons are off and not illuminated.

In response to a copy job being canceled in the image forming apparatus 100, at 633, the image forming apparatus 100 may return to a copy state in which the power button 307 is steadily illuminated, the at least one wireless network button 311 is steadily illuminated, the at least one copy button 309 is steadily illuminated, and the at least one physical menu control button 303 is steadily illuminated.

Concurrently, the LCD display panel 313 may display a number of copies icon 321 along with a two digit default number of copies using the nine segment numeric/character display 315 and the Wi-Fi signal strength 317 with a steadily illuminated signal bar while the other physical, iconographic buttons and the on-off icons are off and not illuminated. In some examples, the default number of copies displayed on segmented numeric/character display 315 may be one.

Figure 7:
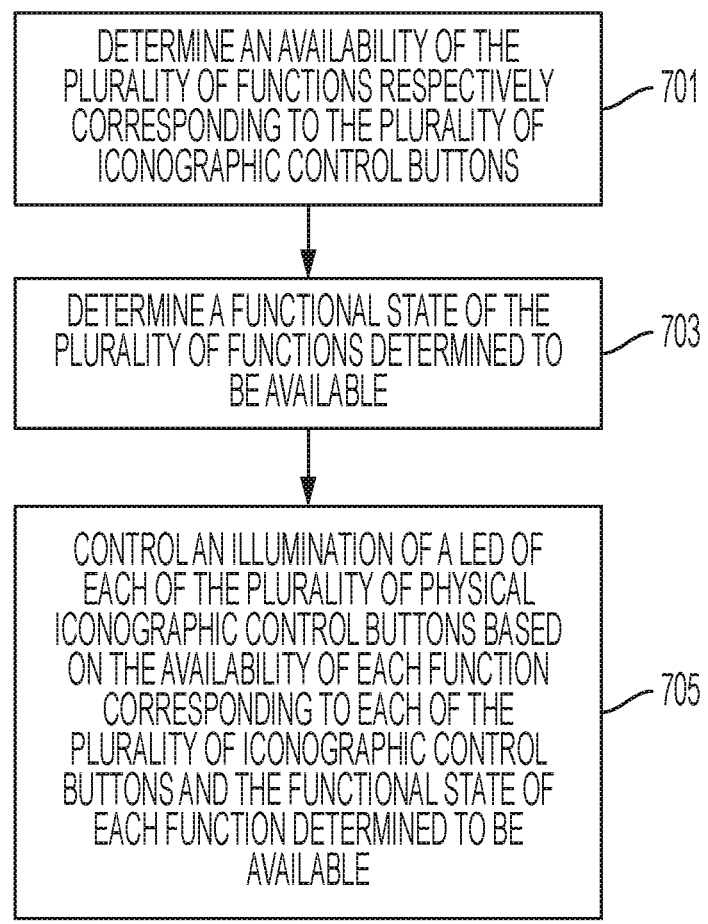
FIG. 7 includes a flow diagram illustrating an example of a method for controlling an illumination of an iconographic control panel.

FIG. 7 includes a flow diagram illustrating an example of a method for controlling an illumination of an iconographic control panel.

Referring to FIG. 7, the at least one processor 120 determines an availability of a plurality of functions of the image forming apparatus respectively corresponding to each of the plurality of physical iconographic control buttons, at operation 701. For example, the at least one processor 120 may determine that a wireless network function is available or a Wi-Fi Direct function is available. The at least one processor 120 may also determine if a print job or copy job is ongoing in which case a cancel function may be available. Additionally, the at least one processor 120 may determine that a document or identification card has been placed on a scanner bed of the image forming apparatus 100 and that a copy function or a copy ID function is available.

At operation 703, the at least one processor 120 determines a functional state of the plurality of functions determined to be available. For example, functional states may include a wireless connection is established, a wireless connection is in progress, a connection error has occurred, Wi-Fi is disabled, Wi-Fi Direct is disabled, a paper jam is present, no paper is present, a print cartridge needs replacement, a print cartridge is not seated properly, a lid of the image forming apparatus 100 is open, etc.

At operation 705, the at least one processor 120 controls an illumination of at least one light source of each of a plurality of physical iconographic control buttons based on the availability of each function corresponding to each of the plurality of iconographic control buttons and the functional state of each function determined to be available. In some examples, the at least one light source may be at least one dedicated LED. For example, if a Wi-Fi connection is established between the image forming apparatus 100 and an external device, the at least one processor 120 may control the illumination of at least one wireless network button 311 corresponding to the Wi-Fi functionality to be a steady blue colored illumination. However, if the at least one processor determines that there is a Wi-Fi connection error, the at least one processor 120 may control the illumination of at least one wireless network button 311 corresponding to the Wi-Fi functionality to be a blinking or flashing amber colored illumination.

While the present disclosure has been described with reference to the drawings and particular examples, those of ordinary skill in the art may make various changes and modifications therein without departing from the spirit and scope of the present disclosure. For example, the described techniques may be performed in a different order than the described method, and/or the described components such as systems, structures, devices, and circuits may be united or combined in a different form than the described method or may be replaced or substituted by other components or equivalents thereof.

What is claimed is:

1. An iconographic control panel of an image forming apparatus, the iconographic control panel comprising:
   a plurality of physical iconographic control buttons, the plurality of physical iconographic control buttons respectively corresponding to a plurality of functions of the image forming apparatus, each of the plurality of physical iconographic control buttons comprising at least one dedicated light emitting diode (LED);
   non-volatile memory; and
   at least one processor, in electrical communication with the non-volatile memory and each of the plurality of physical iconographic control buttons, the at least one processor to:
      determine an availability of the plurality of functions of the image forming apparatus respectively corresponding to each of the plurality of physical iconographic control buttons,
      determine a functional state of the plurality of functions of the image forming apparatus determined to be available, and
      control an illumination of the at least one LED of each of the plurality of physical iconographic control buttons based on the availability of each function corresponding to each of the plurality of physical iconographic control buttons and the functional state of each function determined to be available, the controlling of the at least one LED of each of the plurality of physical iconographic control buttons comprising illuminating an LED of a physical iconographic control button corresponding to a function determined to be available based on a determination that a print job is currently being processed.

2. The iconographic control panel of claim 1, wherein the at least one dedicated LED of each of the plurality of physical iconographic control button comprises at least one of a white LED, an amber LED, a blue LED, a red LED, or a green LED.

3. The iconographic control panel of claim 1, wherein the plurality of physical iconographic control buttons comprise at least one job control button, at least one wireless network button, and a power button.

4. The iconographic control panel of claim 3,
   wherein the at least one job control button comprises a cancel button utilizing a red LED and a resume button utilizing a green LED, and
   wherein the at least one wireless network button comprises a Wi-Fi button utilizing a blue LED and an amber LED and a Wi-Fi direct button utilizing a white LED.

5. The iconographic control panel of claim 1, wherein the at least one processor controls the illumination of the at least one LED of each of the plurality of physical iconographic control buttons by at least one of controlling a color of illumination of the at least one LED or controlling a pattern of illumination of the at least one LED.

6. The iconographic control panel of claim 5, wherein the pattern of illumination of the at least one LED comprises a constant illumination of the at least one LED, a blinking illumination of the at least one LED, or no illumination of the at least one LED.

7. The iconographic control panel of claim 6,
   wherein, based on a first function of the plurality of functions being available and the functional state of the first function being normal, the corresponding physical iconographic control button is illuminated with a constant illumination pattern,
   wherein, based on the first function of the plurality of functions being available and the functional state of the first function being an error state, the corresponding physical iconographic control button is illuminated with a blinking illumination pattern, and
   wherein, based on the first function of the plurality of functions not being available, the corresponding physical iconographic control button is not illuminated.

8. The iconographic control panel of claim 1, further comprising:
   a liquid crystal display (LCD),
   wherein the LCD comprises at least one multi-segment display and at least one icon graphic.

9. The iconographic control panel of claim 8,
   wherein the at least one multi-segment display comprises a seven segment display or a nine segment numeric or character display, and
   wherein the at least one icon comprises a Wi-Fi icon, a signal strength icon, a Wi-Fi direct icon, a contrast icon, a number of copies icon, and an image copy size scaling icon.

10. The iconographic control panel of claim 1, further comprising at least one trouble shooting LED indicating a functional error with at least one of a paper supply of the image forming apparatus, a toner cartridge of the image forming apparatus, or a lid of the image forming apparatus.

11. An image forming apparatus, comprising:
   an iconographic control panel comprising a plurality of physical iconographic control buttons, the plurality of physical iconographic control buttons respectively corresponding to a plurality of functions of the image forming apparatus, each of the plurality of physical iconographic control buttons comprising at least one dedicated light emitting diode (LED);
   a toner fuel gauge;
   non-volatile memory; and
   at least one processor, in electrical communication with the non-volatile memory and each of the plurality of physical iconographic control buttons, the at least one processor to:
      determine an availability of the plurality of functions of the image forming apparatus respectively corresponding to each of the plurality of physical iconographic control buttons,
      determine a functional state of the plurality of functions of the image forming apparatus determined to be available, and
      control an illumination of the LED of each of the plurality of physical iconographic control buttons based on the availability of each function corresponding to each of the plurality of physical iconographic control buttons and the functional state of each function determined to be available, the controlling of the at least one LED of each of the plurality of physical iconographic control buttons comprising illuminating an LED of a physical iconographic control button corresponding to a function determined to be available based on a determination that a print job is currently being processed.

12. The image forming apparatus of claim 11,
wherein the toner fuel gauge comprises at least one icon, and
wherein the at least one icon indicates at least one of a toner level and a refill necessary notification.

13. The image forming apparatus of claim 11, wherein the at least one processor controls the illumination of the at least one LED of each of the plurality of physical iconographic control buttons by at least one of controlling a color of illumination of the at least one LED or controlling a pattern of illumination of the at least one LED.

14. The image forming apparatus of claim 11, wherein, based on a first function of the plurality of functions being available and the functional state of the first function being normal the corresponding physical iconographic control button is illuminated with a constant illumination pattern,
wherein, based on the first function of the plurality of functions being available and the functional state of the first function being an error state, the corresponding physical iconographic control button is illuminated with a blinking illumination pattern, and
wherein, based on the first function of the plurality of functions not being available, the corresponding physical iconographic control button is not illuminated.

15. The image forming apparatus of claim 14, further comprising an image capturing apparatus controlled by the iconographic control panel.

16. The image forming apparatus of claim 11, wherein the physical iconographic control button corresponding to the function determined to be available comprises a cancel button.

17. The image forming apparatus of claim 11, wherein the controlling of the at least one LED of each of the plurality of physical iconographic control buttons comprising illuminating an LED of a physical iconographic control button corresponding to a function determined to be available based on a determination that a print job error has been cleared.

\* \* \* \* \*